(12) United States Patent
Clapper

(10) Patent No.: US 7,254,454 B2
(45) Date of Patent: Aug. 7, 2007

(54) FUTURE CAPTURE OF BLOCK MATCHING CLIP

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 613 days.

(21) Appl. No.: 09/769,157

(22) Filed: Jan. 24, 2001

(65) Prior Publication Data

US 2002/0099459 A1 Jul. 25, 2002

(51) Int. Cl.
G06F 17/00 (2006.01)
(52) U.S. Cl. .................. 700/94; 386/125; 386/46; 381/77
(58) Field of Classification Search ............. 381/72, 381/62; 700/94; 360/7; 386/45, 125–126, 386/46–83
See application file for complete search history.

(56) References Cited

U.S. PATENT DOCUMENTS

| | | | |
|---|---|---|---|
| 6,006,005 A * | 12/1999 | Okitsu ................ | 386/46 |
| 6,061,056 A * | 5/2000 | Menard et al. ......... | 715/704 |
| 6,125,259 A * | 9/2000 | Perlman ............... | 725/28 |
| 6,163,508 A * | 12/2000 | Kim et al. ............ | 369/7 |
| 6,400,652 B1 * | 6/2002 | Goldberg et al. ...... | 369/7 |
| 6,570,080 B1 * | 5/2003 | Hasegawa et al. ...... | 84/609 |
| 6,587,404 B1 * | 7/2003 | Keller et al. ......... | 369/30.06 |

FOREIGN PATENT DOCUMENTS

| | | | |
|---|---|---|---|
| DE | 4106927 C | * | 5/1992 |
| JP | 05-089558 | * | 4/1993 |
| JP | 410055656 A | * | 2/1998 |
| JP | 2000-312323 | * | 11/2000 |

OTHER PUBLICATIONS

Polash; Onternet Based Musical Indexing System for Radio; Apr. 15, 1999; WO 99/18518.*

* cited by examiner

*Primary Examiner*—Melur Ramakrishnaiah
(74) *Attorney, Agent, or Firm*—Trop, Pruner & Hu, P.C.

(57) ABSTRACT

A method and apparatus for capturing future instances of a song or a television show or the like. Responsive to a user activating a trigger, typically during the middle of the song or show, the system stores a clip and thereafter begins to monitor one or more channels or stations, attempting to locate that clip, such as by using DSP techniques. Upon finding the clip, the beginning and ending points of the song or show are identified, and the song or show is saved. Hunting may continue, to find a best available version of the song or show, such as one having the best noise characteristics.

39 Claims, 2 Drawing Sheets

FUTURE CAPTURE OF BLOCK MATCHING CLIP

BACKGROUND OF THE INVENTION

1. Technical Field of the Invention

The present invention relates generally to recording of media content.

2. Background Art

Presently, if a user wishes to record a media content item in its entirety but the user did not begin recording at or before the start of the media content item, the user will need to take many steps at a future time to record it. The user will first need to ascertain an identification of the media content item, then identify a future time at which the media content item will be rebroadcast, then begin recording prior to the rebroadcast. In many instances, some or all of those steps can be difficult. Examples of media content items may include a song the user is hearing on a radio broadcast or a television program the user is watching on a television broadcast, or the like.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

While the invention will, for the sake of simplicity and clarity, be explained in terms of an exemplary embodiment which is used to perform future capture of a song from a radio broadcast, the skilled reader will readily appreciate that the invention is not limited to this embodiment. Rather, the invention has applicability in a variety of embodiments and with a variety of media content types. The invention may be utilized in capturing media content items which have defined beginning and ending points, such as songs or television shows, but it may also be utilized in capturing arbitrary portions of a media stream lacking predetermined starting or ending points. The phrase "block" will be used herein to refer generically to both complete songs/shows/etc. and/or to portions or arbitrary segments of such, or to continuous streams of content.

Figure 1:
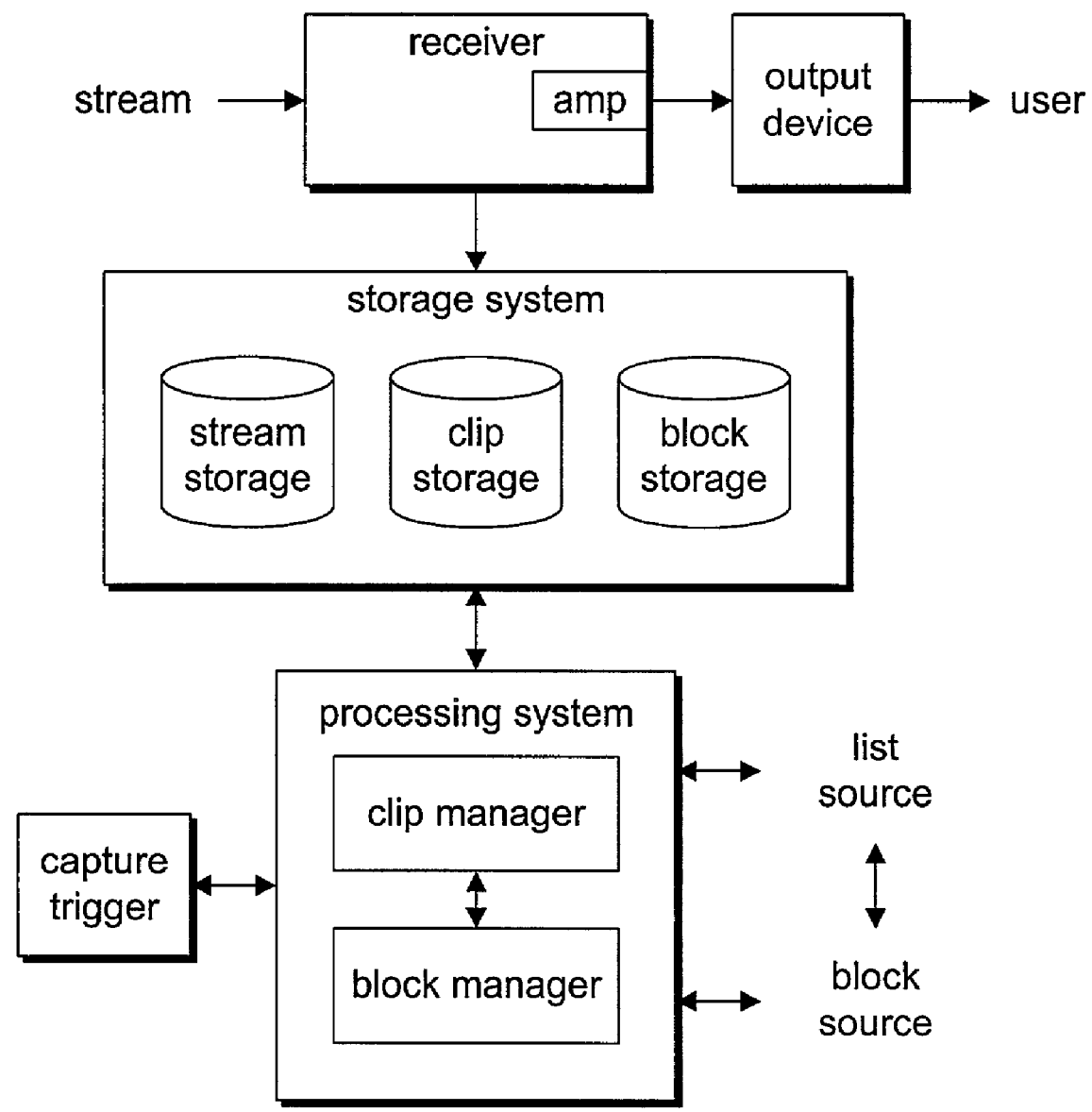
FIG. 1 shows a block diagram representation of one embodiment of an apparatus of the invention.

FIG. 1 illustrates one embodiment of a system which utilizes the invention to perform future capture of a block from one or more incoming media streams ("stream"). The term "stream" should not be interpreted as necessarily meaning "streaming media", but is intended to cover broadcasts and transmissions of all forms, whether they be carried over the airwaves, over cable or other wired system, or any other suitable communication mechanism. The system includes a receiver which receives the stream, perhaps more than one stream at a time from one or more communication mechanisms. The system includes an output device such as a speaker for presenting the stream to the user; the output device may in some embodiments be implemented integrally with the receiver and/or with the other portions of the system. In other embodiments, such as a car radio, the output device such as speakers may be implemented separately from the receiver and/or the future capture system.

The system includes a storage system, coupled to the receiver. The storage system includes storage for one or more clips ("clip storage"), one or more blocks ("block storage"), and one or more streams ("stream storage"). In one embodiment, these may be implemented as separate storage units of a same type or of different types. In another embodiment, one or more of them may be implemented as logically distinct units within a single actual storage device. Any suitable type of storage medium may be used, such as semiconductor memory, hard drive, CD-R or CD-RW, tape, or the like.

The system further includes a processing system, coupled to the storage system in one embodiment. In other embodiments, it may be coupled to the receiver and/or the storage system. The processing system may be constructed in hardware and/or software. It includes a clip manager and a block manager. In some embodiments, the clip manager and block manager may be distinct, while in other embodiments, they may be, for example, portions of the same software application.

Finally, the system includes a capture trigger. The capture trigger includes at least an input mechanism (not shown), and in some embodiments may further include an output mechanism (not shown).

The system may, in some embodiments, optionally have access to an external list source and/or a block source. The list source may be, for example, a play list on a radio station's website, identifying a list of songs that the radio station plays, and perhaps a list of times and dates when they have been played. The block source may be, for example, an on-line music retailer.

Figure 2:
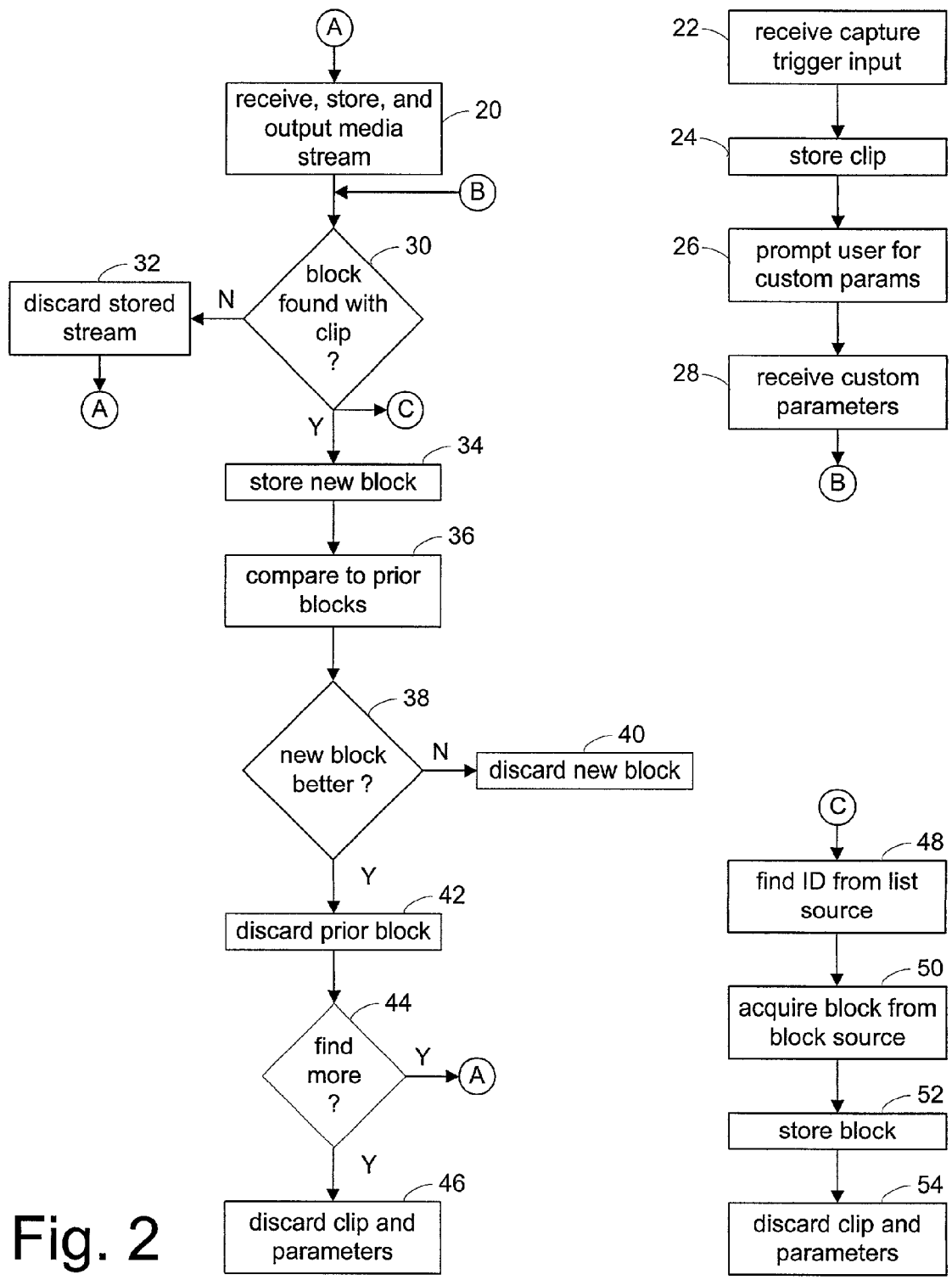
FIG. 2 shows a flowchart representation of one embodiment of a method of the invention.

FIG. 2 illustrates one embodiment of a method of operation of the future capture system. Please make continued reference also to FIG. 1. The receiver receives (20) the media stream and outputs it for the user. In some embodiments, the system may also record the incoming media stream.

At some arbitrary time, the user takes some action to indicate a desire to capture the presently-playing song, such as by pressing a "Capture" button on the radio. The processing system receives (22) this input from the capture trigger, and its clip manager begins storing (24) a "clip" from the incoming media stream to the clip storage. In one mode, the clip store may store the clip itself, such as an analog-to-digital conversion of the clip. In other modes, the clip store may store some other representation of the clip, such as a cyclic redundancy check value of the clip, or a digital signal processing (DSP) representation of the clip, or some other representation which is suitable for future comparing against the media stream to locate a matching portion.

The reader will appreciate that a "matching" portion of the stream will not necessarily be a digitally exact equivalent of the clip. For example, the subsequent rebroadcast of the same block may be on a different station having different sound shaping characteristics, or it may be sent with different gain on the carrier signal, or it may be in a more or less noisy ambient environment, and so forth. Well-known digital signal processing techniques are equipped to identify matches within a predetermined or controllable level of likelihood or tolerance.

In one embodiment, the user may control the length of the clip stored, such as by holding down the "Capture" button. In other embodiments, there may be a default length, such as ten seconds.

In some embodiments, the processing system may prompt (26) the user to enter one or more parameters concerning the clip, the block, and/or the stream. There are many possible parameters. By way of example only and not limitation, the user may indicate and the clip manager may receive (28):
  estimated time into the block that the trigger was hit
  length of possible block to watch for
  suspected name of the song and/or album and/or artist
  number and/or identity of radio stations to monitor for future capture of this song
  number of instances to save for best-instance comparison
  maximum allowable price
  preferred source
  song style
  movie genre
  etc.

The reader will appreciate that, in most embodiments, the receiving, storing, and outputting (20) does not end, but will be an ongoing process during the rest of the method of the invention.

The block manager compares (30) the clip against the incoming stream, attempting to determine whether the block is found in the stream. In some embodiments, this may be accomplished using conventional digital signal processing techniques. In some embodiments, the block manager may utilize a sliding "window" over the stored stream and, when the window moves ahead without finding a match against the clip, the already-analyzed portion of the stored stream may be discarded (32). The block manager may generate a DSP result, or a CRC value, or the like, based upon the contents of the window.

If, however, the clip is found in the window, the block manager will set about storing (34) the block. Typically, this may involve attempting to identify a starting point of the block. In the case of a radio broadcast, there may or may not be near silence at the beginning of the song. In the case of a television broadcast, the block manager may look for blank frames or it may estimate based upon the fact that most shows begin on half-hour times. The block manager may make its own determination, or it may prompt the user to identify the start or to validate the block manager's identification of the start. The same holds true for the end, as well. Ultimately, the block will be stored to the block storage.

In some embodiments, the block manager may continue hunting for further instances of that same block. The first instance found may be imperfect. For example, the radio station may have faded an immediately-previous song out as it was fading this song in. Or, the DJ may have been talking over the beginning of the song. Or, there may have been radio interference or other noise, and so forth.

The block manager compares (36) the new block against any previously-captured and stored instances of that block. If the new block is not better (as determined by the block manager or the user), the block manager may optionally discard (40) the new block. Otherwise, it may optionally discard (42) the previous instances of the block. Typically, it may be desirable to only store a then-best instance. In other cases, it may be desirable to store all instances, in case the user may wish to pick a best one at a later time or in better circumstances or using different equipment.

If (44) the block manager has been configured to continue looking for further instances, the method continues. Otherwise, the clip manager may optionally discard (46) the clip.

Back at decision (30), in some embodiments, upon finding the clip in the search window, the processing system may also optionally find (48) an identification of the currently-playing block from a list source. The list source will typically be an external source, but may be internal to the system. In some cases, identifying the block may include querying the radio station's website. The website may identify the currently-playing song, in which case the identification is complete, and the block manager may acquire (50) the block from a block source, such as an on-line retailer. In other cases, the website may only include a list of songs that are in rotation at this general time. In those cases, the block manager may have to acquire each of those from the block source until it finds one that matches the clip. Ideally, the block source would not charge for providing the non-matching blocks. Once the block is found, acquired, and stored, the clip and parameters may be discarded (54). In most instances, a block acquired from an external block source will be of sufficiently good quality that there may not be any need to continue (44) hunting for additional instances.

In some embodiments, the clip manager and block manager may be equipped to hunt for only a single clip/block at a time. In other embodiments, they may be equipped to hunt for multiple clips/blocks at a time. Clip comparison can be applied to every stream element sequentially or in parallel, looking for desired blocks.

In various embodiments, the apparatus may be embodied as a car radio, a radio or television for use in a home entertainment system, a cable/satellite set-top box, gaming console, or other suitable system or format.

Reference to "subsequent" does not necessarily mean "immediately following".

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A method comprising:
  receiving a media stream to store content from said media stream in a storage;
  searching in the content that has been stored for an instance of a clip that was captured from the media stream, the clip captured at random, other than near a start of a particular content item and before said searching, said clip to be stored in a clip storage; and
  if the clip is found, storing in another storage one segment of the content in which the clip was found, said storage of said one segment from an indicator in the content that identifies the start of the one segment and including the clip, otherwise if the clip is not found, discarding a portion of previously searched content.

2. The method of claim 1 wherein searching for a clip comprises:
performing digital signal processing upon a window of the stored content to produce a digital signal processing window result;
performing digital signal processing upon the clip to produce a digital signal processing clip result; and
comparing the digital signal processing window result to the digital signal processing clip result.

3. The method of claim 1 further comprising:
identifying an end point of the one segment; and
storing the one segment from the start point to the end point.

4. The method of claim 1 further comprising:
finding a plurality of different clips in the content that has been stored; and
storing a plurality of segments of the content, each segment in the plurality including a corresponding clip.

5. The method of claim 4 further comprising:
comparing every clip in said plurality to the stored content in parallel.

6. The method of claim 1 wherein the media stream comprises audio and the indicator that identifies the start is near silence.

7. The method of claim 6 wherein the audio comprises broadcast radio.

8. The method of claim 1 wherein the media stream comprises video and the indicator that identifies the start includes blank frames.

9. The method of claim 8 wherein the media stream comprises television and the indicator that identifies the start includes a predetermined time interval.

10. The method of claim 1 further comprising:
receiving parameters, and wherein at least one of the searching for a clip and storing a segment are responsive to the parameters.

11. The method of claim 10 wherein the parameters comprise at least one of:
an estimated time into the first portion that a trigger was activated;
a length of possible segment to watch for;
a suspected identification of the one segment;
a specification of one or more broadcast stations to monitor;
a number of instances to save for best-instance comparison;
a maximum allowable price;
a preferred source;
a song style; and
a movie genre.

12. The method of claim 1 further comprising:
identifying a media content item corresponding to the clip; and
obtaining the media content item from a source which is different than the media stream.

13. The method of claim 12 wherein the source is an on-line retailer.

14. An apparatus comprising:
a receiver to receive a media stream;
a capture trigger to designate a clip of the media stream, said clip captured other than near a start of a block of content;
a storage system coupled to the receiver to separately store the clip, the media stream that is digital, and a block of content, said block a subset of said digital media and including said clip; and
a processing system coupled to the storage system to receive an estimated time into the block of content that the capture trigger was activated, and based on the estimated time search for the clip in the stored digital media after storage of the clip, in response to finding the clip, identify, in the digital media, a start point of the block including the clip, and store the block from the start in a portion of said storage system other than the portion used to store said digital data.

15. The apparatus of claim 14 further comprising:
a block manager to store a block of the digital media to the storage system, the clip a subset of the block.

16. The apparatus of claim 15 wherein the media stream comprises a radio broadcast and the block comprises a song.

17. The apparatus of claim 15 wherein the media stream comprises a television broadcast and the block comprises a television show.

18. The apparatus of claim 15 wherein the receiver is coupled to receive the media stream over a wireless broadcast channel.

19. The apparatus of claim 15 wherein the receiver is coupled to receive the media stream over a wired broadcast channel.

20. The apparatus of claim 15 further comprising:
an output device coupled to the receiver to play the media stream and wherein the user controls the length of the clip stored.

21. The apparatus of claim 14 wherein the processing system comprises a block manager, said block manager containing instructions that, if executed enable the processor to locate two blocks in the digital media, said blocks to include said clip.

22. The apparatus of claim 21 further including instructions that, if executed, enable the block manager to compare a first block and a second block, and to discard one of the compared blocks.

23. The apparatus of claim 22 further including instructions that, if executed, enable the block manager to discard a portion of the digital media that does not include the clip.

24. The apparatus of claim 21 wherein the storage comprises a clip storage to store the clip, a block storage to store the two blocks, and a stream storage to store the digital data corresponding with the media stream.

25. An article comprising a machine-readable storage medium containing instructions that if executed enable a system to:
receive a media stream to store said media stream in a stream storage in digital form;
search in the digital data from the stream storage for an instance of a clip, the clip captured at random and other than near a start of particular content item, said capture before said search, said clip to be stored in a clip storage; and
if the clip is found, store, in a storage unit other than said stream storage, a first portion of the digital data from an identified start of the first portion to an identified endpoint of the first portion and including the clip, otherwise if the clip is not found, discarding a portion of the digital data that has been searched.

26. The article of claim 25 further comprising instructions that if executed enable the system to find an additional clip in the digital data at a third time later than said first time, and store a second portion of the digital data greater than and including the clip.

27. The article of claim 26 further comprising instructions that if executed enable the system to compare the first portion to the second portion, and discard one of the portions, based on the comparison.

28. The article of claim 25 further comprising instructions that if executed enable the system to identify a media content item corresponding to the clip, and obtain the media content item from a source which is different than the media stream.

29. The article of claim 28 further comprising instructions that if executed enable the system to obtain the media content item from an on-line retailer.

30. A method comprising:
using an integral system, capturing a clip from a media stream, said capture after a beginning portion of a block of content that includes said clip;
after said capture and on the system, finding the clip in a digital rendering of the media stream; and
using the system and in response to the finding, identifying a currently playing block of content that includes the clip to obtain the content from a source other than the media stream.

31. The method of claim 30 including finding the clip in the digital rendering at another later time, and storing another block of content from the start of the another block.

32. The method of claim 31 including comparing the block and the another block to select one of the block and the another block for storage.

33. The method of claim 32 including discarding a block that was not selected.

34. The method of claim 30 wherein the media stream is a radio broadcast and identifying the block of content includes identifying the block of content based on finding the clip in another block of content that was received from the radio station's website.

35. The method of claim 30 including obtaining the content from an on-line retailer.

36. The method of claim 30 wherein finding the clip includes performing digital signal processing upon the digital data rendering of the media stream and upon the clip to produce processing results, and comparing the processing results for the media stream and the clip.

37. The method of claim 30 including discarding a portion of a searched digital rendering in which the clip was not found.

38. The method of claim 30 wherein said media stream comprises television.

39. The method of claim 30 wherein identifying a currently playing block of content includes querying a website associated with the provider that is broadcasting the media stream.

* * * * *